(12) United States Patent
Kamigaki et al.

(10) Patent No.: US 11,994,791 B2
(45) Date of Patent: May 28, 2024

(54) PROJECTION DEVICE

(71) Applicant: FUJIFILM Corporation, Tokyo (JP)

(72) Inventors: Tetsuo Kamigaki, Saitama (JP);
Hironobu Kayano, Saitama (JP);
Masaru Amano, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 285 days.

(21) Appl. No.: 17/677,001

(22) Filed: Feb. 22, 2022

(65) Prior Publication Data

US 2022/0179297 A1 Jun. 9, 2022

Related U.S. Application Data

(63) Continuation of application No. PCT/JP2020/030876, filed on Aug. 14, 2020.

(30) Foreign Application Priority Data

Aug. 30, 2019 (JP) .................................. 2019-158530

(51) Int. Cl.
*G03B 21/14* (2006.01)
*G03B 21/20* (2006.01)
(Continued)

(52) U.S. Cl.
CPC ....... *G03B 21/142* (2013.01); *G03B 21/2033* (2013.01); *G03B 21/28* (2013.01); *H04N 9/3105* (2013.01); *H04N 2005/745* (2013.01)

(58) Field of Classification Search
CPC .. G03B 21/142; G03B 21/2033; G03B 21/28; H04N 9/3105; H04N 2005/754
(Continued)

(56) References Cited

U.S. PATENT DOCUMENTS

2002/0036754 A1 3/2002 Nishida
2006/0197920 A1 9/2006 Furui et al.
(Continued)

FOREIGN PATENT DOCUMENTS

JP 2002-90878 A 3/2002
JP 2005-18030 A 1/2005
(Continued)

OTHER PUBLICATIONS

International Preliminary Report on Patentability and English translation of the Written Opinion of the International Searching Authority (Forms PCT/IB/326, PCT/IB/373 and PCT/ISA/237) for International Application No. PCT/JP2020/030876, dated Mar. 10, 2022.
International Search Report (Form PCT/ISA/210) for International Application No. PCT/JP2020/030876, dated Oct. 13, 2020, with English translation.

*Primary Examiner* — Jerry L Brooks
(74) *Attorney, Agent, or Firm* — Birch, Stewart, Kolasch & Birch, LLP (57) ABSTRACT

One embodiment according to the technique of the present disclosure provides a projection device having a plurality of modes in which relationships between an incidence region and an emission region in an electro-optical panel are different from each other. In the projection device according to one aspect of the present invention, a control unit controls a first mode and a second mode. The first mode is a mode in which a first range of an optical region is the incidence region and a range within the first range is the emission region, and the second mode is a mode in which a second range narrower than the first range of the optical region is the incidence region and a range within the second range is the emission region.

20 Claims, 11 Drawing Sheets

(51) Int. Cl.
*G03B 21/28* (2006.01)
*H04N 5/74* (2006.01)
*H04N 9/31* (2006.01)

(58) Field of Classification Search
USPC .......................................................... 353/101
See application file for complete search history.

(56) References Cited

U.S. PATENT DOCUMENTS

2011/0019166 A1  1/2011  Ishida
2016/0377963 A1  12/2016 Tsuchiya et al.

FOREIGN PATENT DOCUMENTS

| | | |
|---|---|---|
| JP | 2006-246306 A | 9/2006 |
| JP | 2009-294349 A | 12/2009 |
| JP | 2011-27799 A | 2/2011 |
| JP | 2013-37082 A | 2/2013 |
| JP | 2015-228006 A | 12/2015 |
| JP | 2015228006 A * | 12/2015 |
| JP | 2017-10003 A | 1/2017 |
| JP | 2017-111303 A | 6/2017 |

* cited by examiner

PROJECTION DEVICE

CROSS-REFERENCE TO RELATED APPLICATIONS

The present application is a Continuation of PCT International Application No. PCT/JP2020/030876 filed on Aug. 14, 2020 claiming priority under 35 U.S.C § 119(a) to Japanese Patent Application No. 2019-158530 filed on Aug. 30, 2019. Each of the above applications is hereby expressly incorporated by reference, in its entirety, into the present application.

BACKGROUND OF THE INVENTION

1. Field of the Invention

The present invention relates to a projection device that projects video by using an electro-optical panel.

2. Description of the Related Art

A projector described in JP2006-246306A comprises a forming region moving unit that moves a forming region of which the size or the shape is changed by a forming region changing unit, on the basis of position information input from an operation unit, in a case where the forming region is movable in a region of possible modulation. With this, a projection position of an optical image is changed in response to the operation of the operation unit. An image projection device described in JP2011-27799A includes an optical shifting unit that shifts a projection optical system with respect to an image forming element, an image shifting unit that shifts an image forming region in which an original image is formed on the image forming element, an operation unit that is operated to shift a projected image on a projected surface, and a control unit that controls the optical shifting unit and the image shifting unit in response to the operation of the operation unit.

Further, a projector described in JP2009-294349A has a first mode and a second mode, and in the second mode, there is provided a function of moving up and down or up, down, left, and right within a range in which an image display device can display a display position of a display region on the image display device. An image projection device described in JP2017-111303A comprises an illumination unit that emits illumination light, an image display element that receives the illumination light and forms projection light, an image forming optical system that projects the projection light to a target, a first adjustment unit that moves the image display element with respect to the image forming optical system to adjust a projection position, and a second adjustment unit that shifts an optical axis of the illumination unit in response to the movement of the image display element. In the image projection device, the second adjustment unit shifts the optical axis of the illumination unit in response to the movement of the image display element.

SUMMARY OF THE INVENTION

One embodiment according to the technique of the present disclosure provides a projection device having a plurality of modes in which relationships between an incidence region and an emission region in an electro-optical panel are different from each other.

There is provided a projection device according to a first aspect of the present invention, comprising: a light source; an electro-optical panel having an optical region in which an electro-optical element that controls transmission or reflection of light is provided, the electro-optical panel having an incidence region which is defined in the optical region and on which light from the light source is incident and an emission region which is defined in the optical region and from which the light incident on the incidence region is emitted by the electro-optical element; a projection lens that projects the light emitted from the emission region; and a control unit that controls the electro-optical panel or the light incident on the electro-optical panel from the light source to define the incidence region and the emission region, in which the control unit controls a first mode and a second mode, the first mode is a mode in which a first range of the optical region is the incidence region and a range within the first range is the emission region, and the second mode is a mode in which a second range narrower than the first range of the optical region is the incidence region and a range within the second range is the emission region.

In the projection device according to a second aspect, in the first aspect, the control unit moves a position of the incidence region with respect to the projection lens to move an optical image projected from the projection lens.

In the projection device according to a third aspect, in the first or second aspect, the control unit may move a position of the incidence region in the electro-optical panel to move a position of the incidence region with respect to the projection lens.

In the projection device according to a fourth aspect, in the second or third aspect, a relay optical system provided in an optical path from the light source may further be provided, and the control unit may move a part of the relay optical system to move the position of the incidence region with respect to the projection lens.

In the projection device according to a fifth aspect, in the fourth aspect, the relay optical system may have a zoom optical system provided in the optical path from the light source, and the control unit may change a size of the incidence region by changing a zoom magnification of the zoom optical system, to switch between the first mode and the second mode.

In the projection device according to a sixth aspect, in the fourth or fifth aspect, a moving mechanism that moves the electro-optical panel may further be provided, and the control unit may synchronize movement of the electro-optical panel by the moving mechanism with movement of the part of the relay optical system to move the position of the incidence region.

In the projection device according to a seventh aspect, in any one of the third to sixth aspects, the control unit may move the position of the incidence region in the second mode.

In the projection device according to an eighth aspect, in the seventh aspect, the control unit may move the position of the defined incidence region, in the second mode, to move an optical image projected from the projection lens.

In the projection device according to a ninth aspect, in any one of the first to eighth aspects, the control unit may change luminance of light emitted from the light source according to a ratio of a size of the first range and a size of the second range, in the second mode.

In the projection device according to a tenth aspect, in any one of the first to ninth aspects, the control unit may further control a third mode, the third mode may be a mode in which the first range is the incidence region and a third range narrower than the first range is the emission region, and the third range of the third mode may be narrower than a range of the emission region in the first mode.

In the projection device according to an eleventh aspect, in the tenth aspect, the control unit may move a position of the incidence region in the second mode to move a projected image projected from the projection lens, and the control unit may move a position of the emission region in the third mode to move the projected image.

DESCRIPTION OF THE PREFERRED EMBODIMENTS

One embodiment of a projection device according to the present invention is as follows. Description will be made with reference to the accompanying drawings as necessary.

<Overall Configuration of Projection Device>

Figure 1:
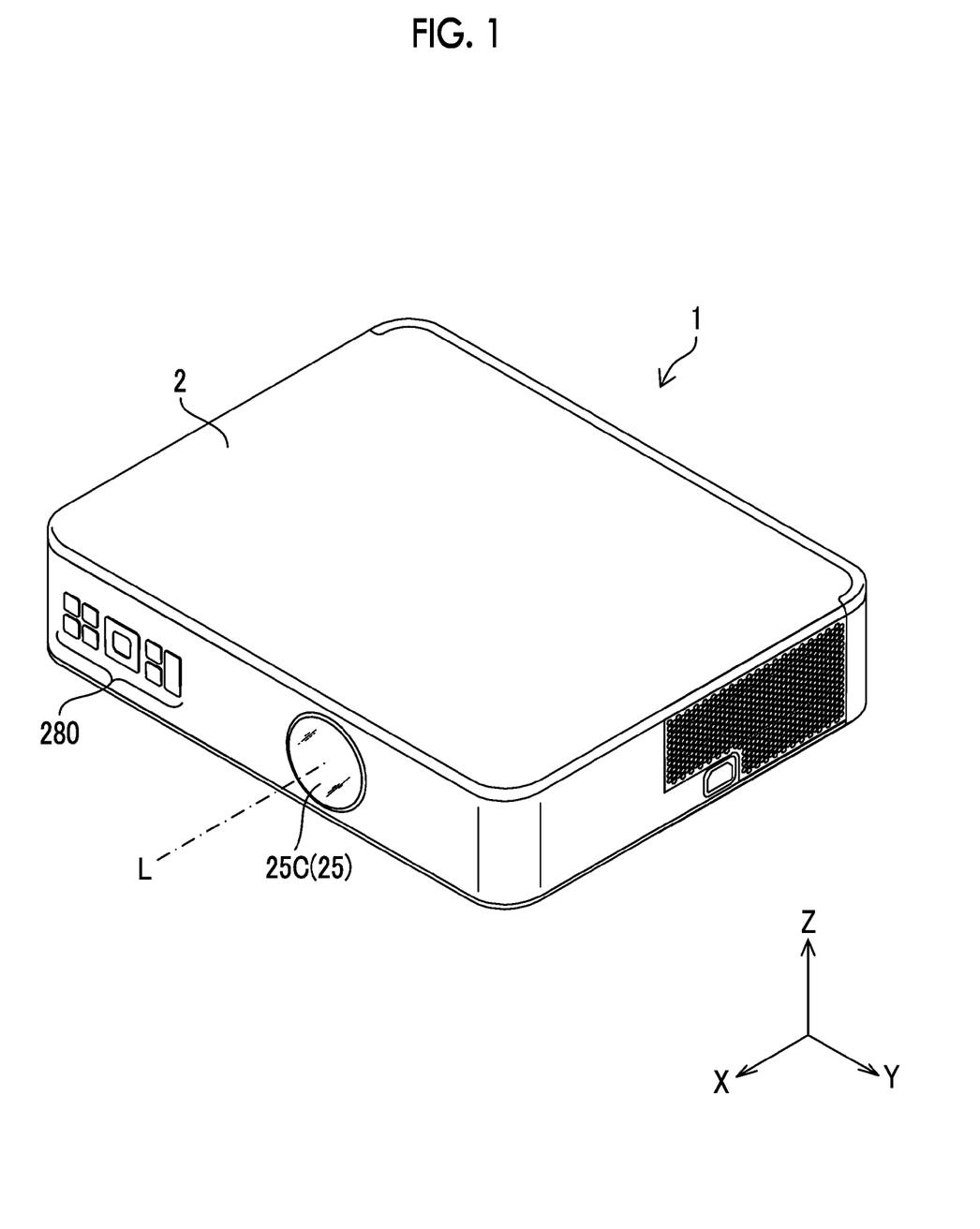
FIG. 1 is a perspective view of a projection device according to a first embodiment.

FIG. 1 is a perspective view of a projection device 1 (projection device). The projection device 1 has a flat rectangular parallelepiped main body 2 as a w % bole, and an optical axis L of a fixed lens 25C (see FIG. 2) is in a +X-axis direction. Further, a main body operation unit 280 is provided on a front surface of the main body 2.

<Configuration of Optical System>

Figure 2:
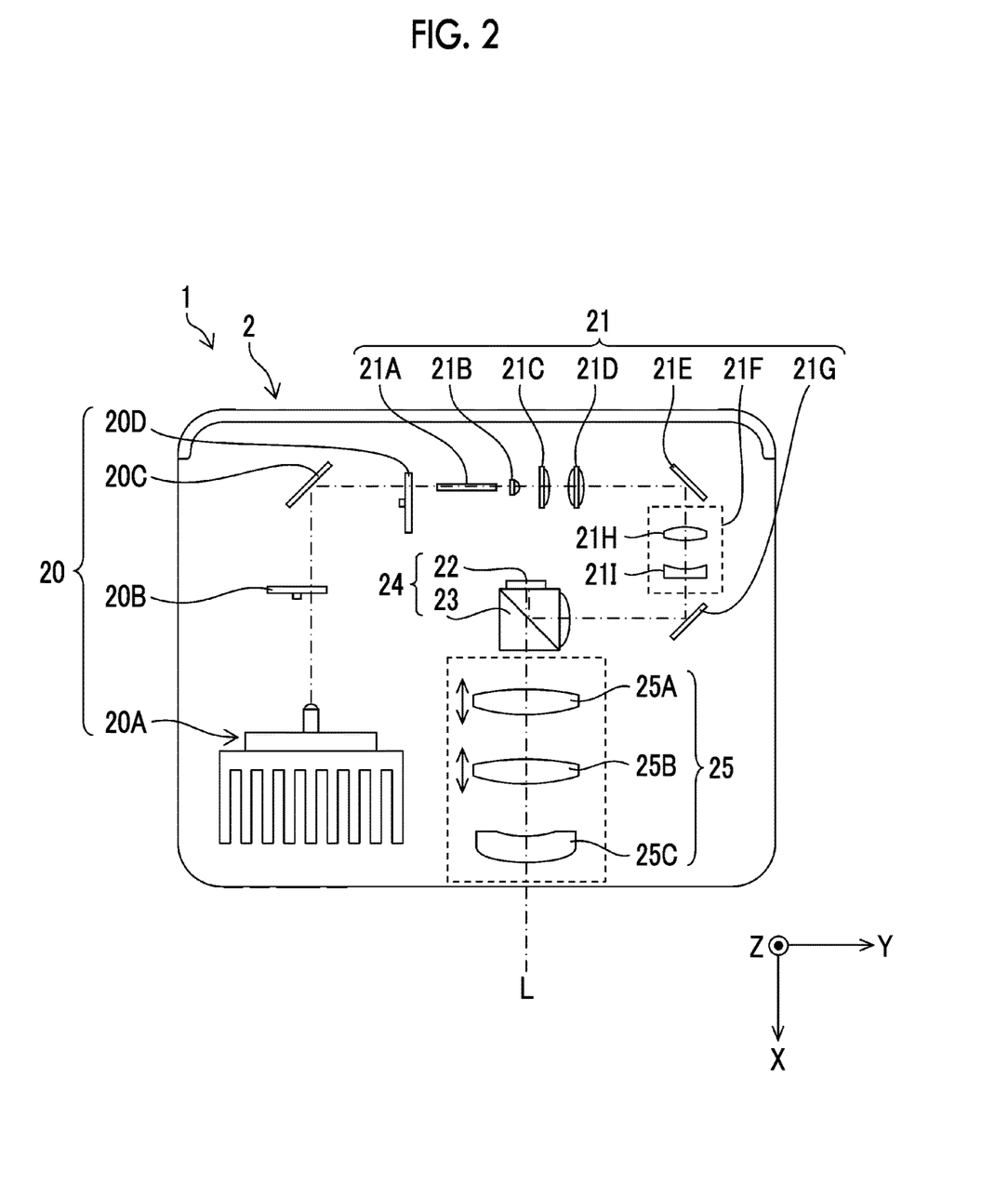
FIG. 2 is a diagram showing a configuration of an optical system of the projection device.

FIG. 2 is a diagram showing a configuration of an optical system of the projection device 1. As shown in FIG. 2, a light source unit 20 (light source), a relay optical system 21 (relay optical system), a video display unit 24, and a projection lens 25 (projection lens) are disposed in the main body 2.

The light source unit 20 comprises a laser light source 20A, a phosphor wheel 20B, a mirror 20C, and a color wheel 20D. The light source unit 20 generates three colors of light of red color, green color, and blue color (or four colors of light of red color, green color, blue color, and yellow color) from a blue laser emitted from the laser light source 20A by the phosphor wheel 20B and the color wheel 20D, and emits the light in a time-division manner. The light source unit 20 has the laser light source 20A that emits laser light in this example, but a light emitting diode that emits white light or three light emitting diodes that emit monochromatic light of red, green, and blue, respectively, may also be used. In a case where the light emitting diodes having three colors are used, the color wheel 20D may be omitted.

The relay optical system 21 is provided in an optical path from the light source unit 20, and comprises a rod integrator 21A, a lens 21B, a lens 21C, a lens 21D, a first mirror 21E, a zoom optical system 21F, and a second mirror 21G. The light emitted from the color wheel 20D of the light source unit 20 is incident on the rod integrator 21A and is made uniform. The light emitted from the rod integrator 21A is relayed by the lens 21B, the lens 21C, and the lens 21D, and is incident on a video display unit 24 via the first mirror 21E, the zoom optical system 21F (zoom optical system), and the second mirror 21G. The zoom optical system 21F has a convex lens 21H and a concave lens 21I, and a movement control unit 240 (see FIG. 4) makes the lenses advance and retreat in a direction of the optical axis L to enable a parallel pencil of light incident on the zoom optical system 21F to be emitted as a parallel pencil of light having a different diameter.

As will be described in detail later, the movement control unit 240 moves the first mirror 21E, the zoom optical system 21F, and the second mirror 21G, which are parts of the relay optical system 21. By doing so, the movement control unit 240 moves a position of the incidence region with respect to the projection lens 25 (projection lens), to enable a projected image (optical image) projected from the projection lens 25 to be moved.

Figure 3:
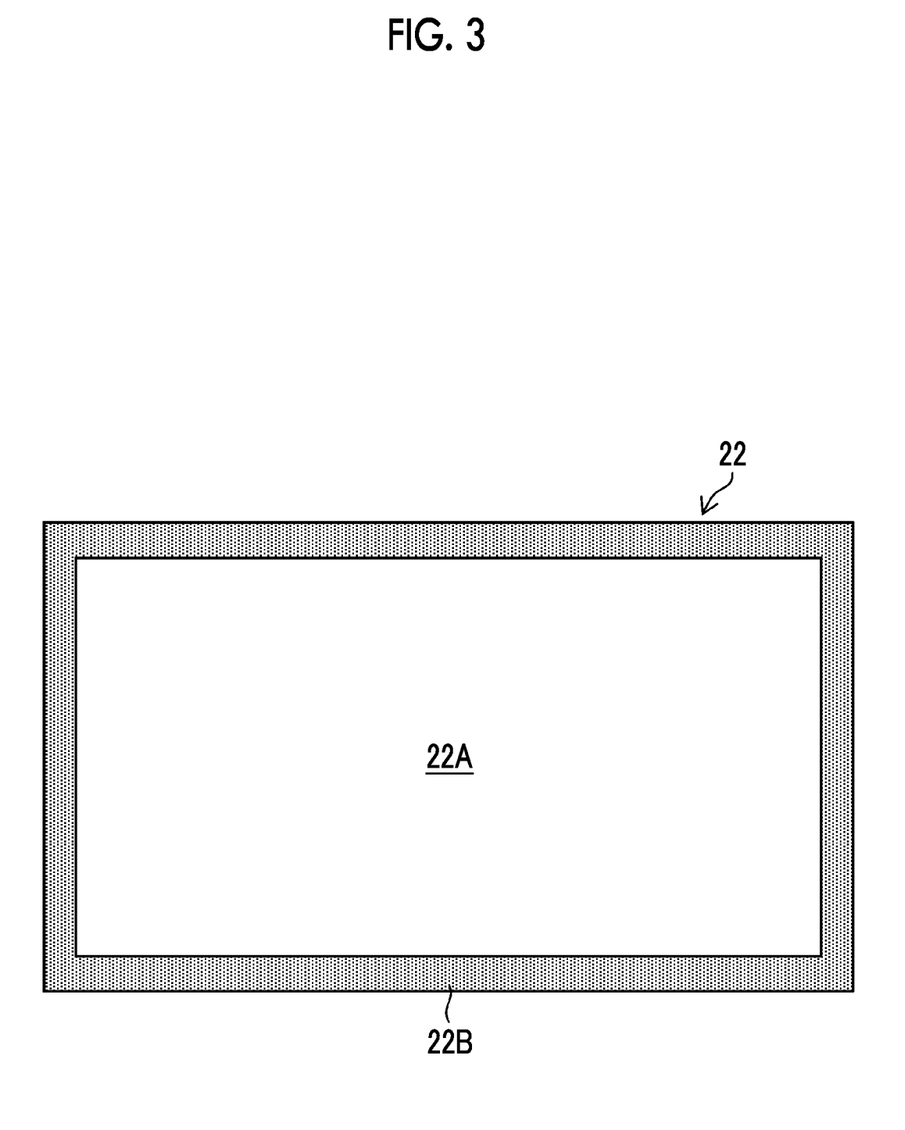
FIG. 3 is a diagram showing an optical region and a non-optical region of an electro-optical element.

The video display unit 24 comprises a total reflection prism 23 and a Digital Micromirror Device (DMD (registered trademark)) 22, and receives the light emitted from the relay optical system 21 to generate a video. The total reflection prism 23 guides the light incident from the relay optical system 21 to the DMD 22. The DMD 22 is a light modulation element that modulates the light having each color component, which is incident via the total reflection prism 23, in a time-division manner, and has an optical region 22A (optical region) in which a large number of micromirrors (electro-optical element) capable of switching the reflection direction are provided and a non-optical region 22B constituted of a circuit that controls the optical region 22A, a frame that holds the optical region 22A, and the like (see FIG. 3). The DMD 22 changes the angle of each micromirror in response to a video signal to modulate incident light. The light modulated by the DMD 22 is transmitted through the total reflection prism 23 and is guided to the projection lens 25.

The display control unit 230 (control unit) controls the DMD 22 (electro-optical panel) or the light incident on the DMD 22 (electro-optical element) from the light source unit 20 (light source), as will be described in detail later, to define the incidence region and the emission region in the optical region 22A. The incidence region is a region that is defined by a region on which the light from the light source is incident, and the emission region is a region from which the light incident on the incidence region is emitted by the micromirror.

<Electro-Optical Panel Other than DMD>

In the above-described embodiment, the video display unit uses the DMD, but may use a transmissive type or reflective type liquid crystal display panel (one aspect of "an electro-optical panel having an optical region in which an electro-optical element that controls the transmission or reflection of light is provided") as the electro-optical element. Alternatively, an organic or inorganic electro-luminescence (EL) panel in which organic or inorganic light emitting diode elements are arranged may be used as the electro-optical panel. In a case where the liquid crystal display panel is used, as in the case of the DMD, red light, green light, and blue light may be incident on a single liquid crystal display panel in a time-division manner and an image of each color may be generated and projected in a time-division manner, or red light, green light, and blue light may be incident on a plurality of liquid crystal display panels, respectively, and an optical image for each color may be generated, and the generated optical images may be superposed to form a projected image.

<Configuration of Projection Lens>

As shown in FIG. 2, the projection lens 25 comprises a zoom lens 25A, a focus lens 25B, and a fixed lens 25C. The zoom lens 25A and the focus lens 25B are driven by the zoom drive unit 294 and the focus drive unit 292, respectively, and advance and retreat in the direction of the optical axis L to adjust the zoom and focus of the projected image (optical image). The zoom lens 25A, the focus lens 25B, and the fixed lens 25C may be a lens group constituted of a plurality of lenses.

<Configuration of Electrical System>

Figure 4:
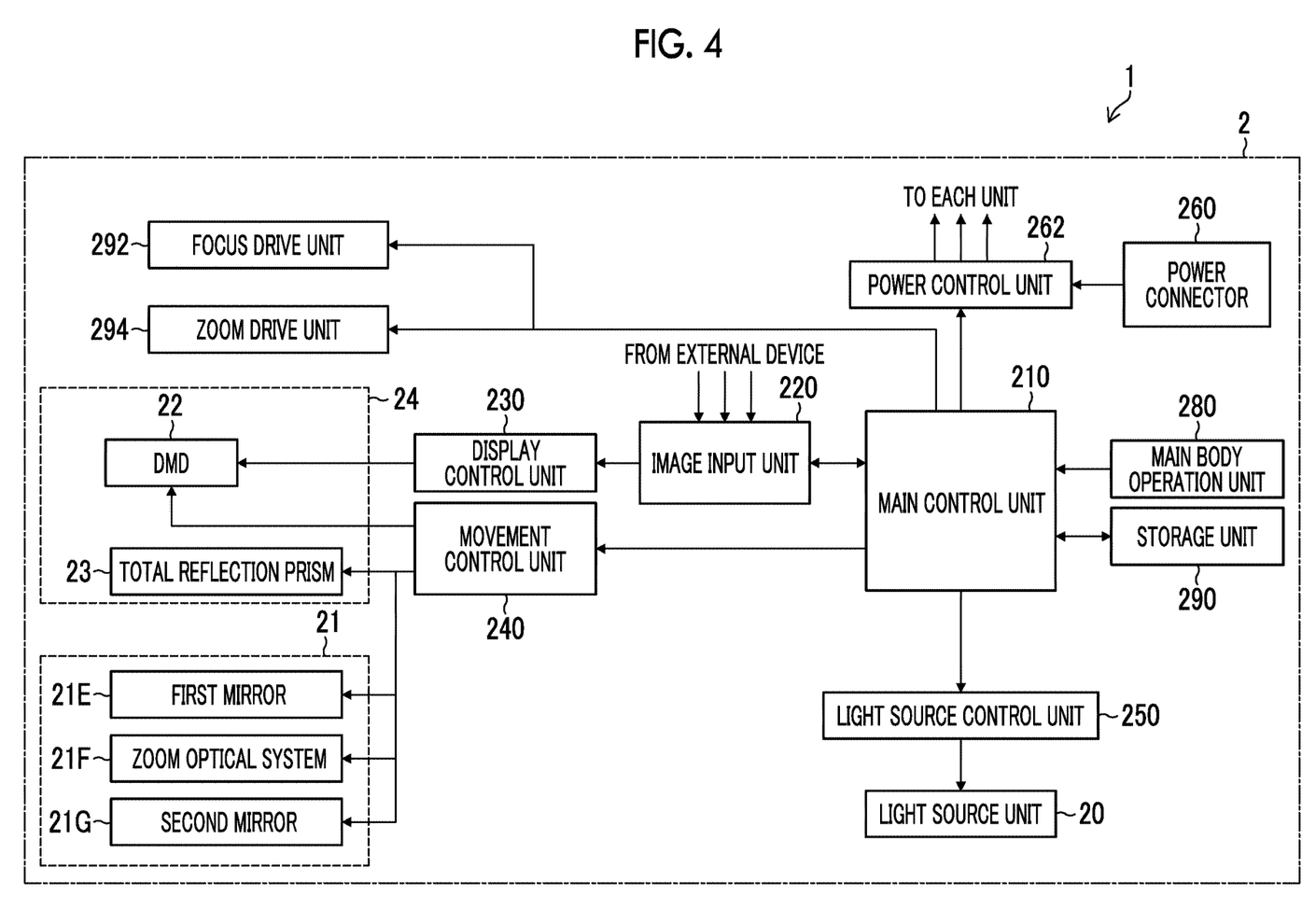
FIG. 4 is a diagram showing a configuration of an electrical system of the projection device.

FIG. 4 is a diagram showing a configuration of an electrical system of the control unit of the projection device 1 (the configuration of the optical system is omitted). As shown in FIG. 4, the main body 2 of the projection device 1 is provided with the above-described light source unit 20, relay optical system 21, DMD 22, total reflection prism 23, and main body operation unit 280. Further, the control unit has a main control unit 210, an image input unit 220, the display control unit 230, the movement control unit 240, and a light source control unit 250. Further, the main body 2 is provided with a power connector 260, a power control unit 262, a storage unit 290, the focus drive unit 292, and the zoom drive unit 294. The control unit includes one of various processors or a combination of a plurality of various processors, as shown below. The various processors include, for example, a central processing unit (CPU), which is a general-purpose processor that executes software (programs) to function as various processing units, a programmable logic device (PLD), such as a field programmable gate array (FPGA), which is a processor having a changeable circuit configuration after manufacture, and a dedicated electrical circuit, such as an application specific integrated circuit (ASIC), which is a processor having a dedicated circuit configuration designed to perform specific processing.

The light source control unit 250 controls light emission or non-light emission of the laser light source 20A. The laser light source 20A may be constituted of one laser diode or a plurality of laser diode arrays.

Power is supplied to the power control unit 262 via the power connector 260. The power control unit 262 supplies the power supplied from the power connector 260 to each unit of the main body 2, in a case where the power switch is turned on.

The storage unit 290 includes a read only memory (ROM), a random access memory (RAM), a flash ROM, and the like. The main control unit 210 controls each unit of the projection device 1 in an integrated manner by using the RAM as a work area, on the basis of a control program stored on the ROM of the storage unit 290, and a table or a parameter stored on the ROM or the flash ROM.

The focus drive unit 292 includes a focus motor (not shown) and a drive circuit thereof, and drives the focus motor on the basis of a focus command from the main control unit 210 to move the focus lens 25B in the direction of the optical axis L. By doing so, the focus of the projected image (optical image) projected from the projection lens 25 onto a surface to be projected (screen or the like) is adjusted.

The zoom drive unit 294 includes a zoom motor (not shown) and a drive circuit thereof, and drives the zoom motor on the basis of a zoom command from the main control unit 210 to move the zoom lens 25A in the direction of the optical axis L. By doing so, the viewing angle (zoom magnification) of the projected image projected from the projection lens 25 onto the surface to be projected is adjusted.

A video signal is input to the image input unit 220 via a video input terminal, from an external device such as a personal computer. The image input unit 220 outputs the input video signal in accordance with the control by the main control unit 210 to the display control unit 230 as a projected image.

The display control unit 230 (control unit) receives the input of the projected image from the image input unit 220 and outputs the projected image to the DMD 22. When outputting the image, the display control unit 230 defines an incidence region and an emission region in the optical region 22A according to the mode (first mode and second mode) on the basis of a display control command from the main control unit 210. The display control unit 230 may output the projected image and an on screen display (OSD) image (message to a user, operation guide, and the like) individually or a combination thereof to the DMD 22, in response to the input of the OSD image from an OSD image output unit (not shown).

The movement control unit 240 (control unit) moves the relay optical system 21, the DMD 22, and the total reflection prism 23 to move the position of the incidence region with respect to the projection lens 25. By doing so, the movement control unit 240 moves a projected image (optical image) projected from the projection lens 25 (described later). The movement includes parallel movement and rotational movement.

<First Mode and Second Mode>

The display control unit 230 (control unit) and the movement control unit 240 (control unit) control the first mode and the second mode in which the relationships between the incidence region and the emission region are different from each other. The first mode is a mode in which a first range of the optical region 22A is the incidence region and a range within the first range is the emission region from which light is emitted to the projection lens 25, and the second mode is a mode in which a second range narrower than the first range of the optical region 22A is the incidence region and a range within the second range is the emission region. That is, the projection device 1 has a plurality of modes in which the relationships between the incidence region and the emission region in the electro-optical panel are different from each other. The user may give an instruction to switch between the first and second modes by operating the main body operation unit 280, so that an image can be projected in a desired mode.

<Incidence Region and Emission Region in First Mode>

Figure 5A:
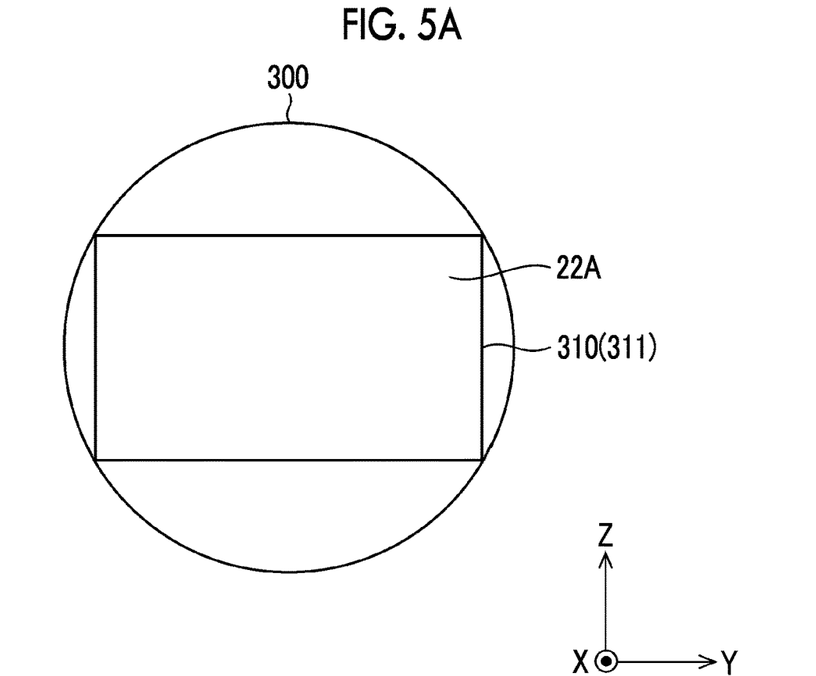
FIGS. 5A and 5B are diagrams showing an incidence region and an emission region in a first mode.
Figure 5B:
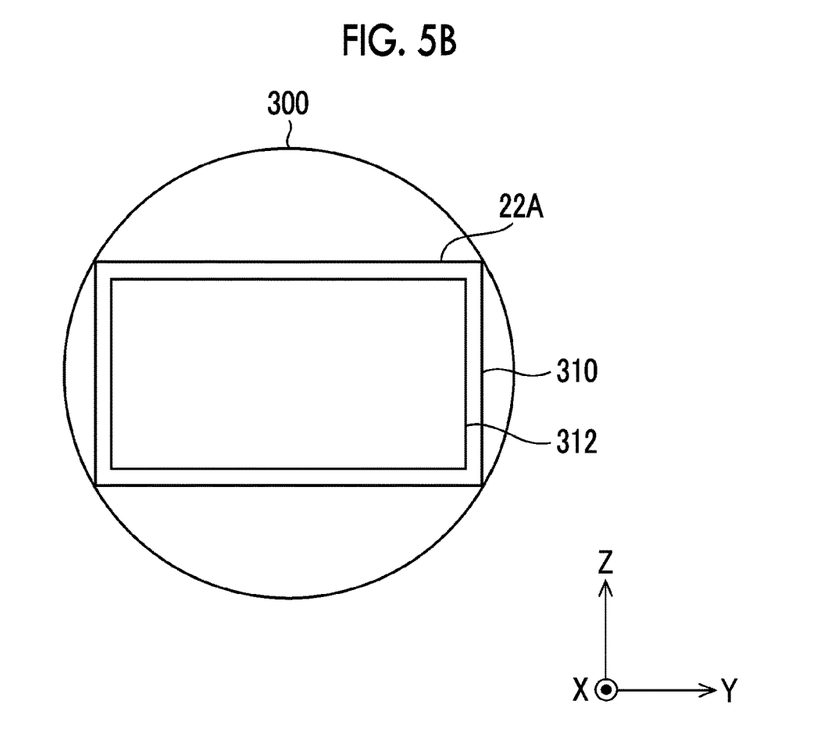

FIGS. 5A and 5B are diagrams showing examples of the incidence region and the emission region in the first mode, in the optical region 22A of the DMD 22. In the example shown in FIG. 5A, a pencil of light 300 having a diameter that covers the entire optical region 22A is incident on the DMD 22 in response to the control of the zoom optical system 21F by the movement control unit 240 (control unit), and the display control unit 230 (control unit) defines the entire optical region 22A (an example of "the first range") as an incidence region 310. Further, the display control unit 230 defines the entire range of the incidence region 310 as an emission region 311. That is, the incidence region 310 and the emission region 311 are the same (both are the first range). Meanwhile, in the example shown in FIG. 5B, the display control unit 230 controls the angle of the micromirror of the DMD 22 to define a range narrower than the incidence region 310 as an emission region 312.

As described above, the emission region 312 is a region from which light is emitted to the projection lens 25, and the change of a range of light emitted to the projection lens 25 using the electro-optical panel can change the emission region 312. For example, the angle of the micromirror is controlled in a case where the electro-optical panel is DMD 22, so that the size of the emission region can be controlled. Alternatively, the rotation of a liquid crystal molecule is controlled in a case where the electro-optical panel is a liquid crystal display panel, so that the size of the emission region 312 can be controlled. Alternatively, the light emission of the diode is controlled in a case where the electro-optical panel is an organic or inorganic EL panel, so that the size of the emission region 312 can be controlled.

<Incidence Region and Emission Region in Second Mode>

The display control unit 230 (control unit) and the movement control unit 240 (control unit) move the position of the incidence region with respect to the projection lens 25, in the second mode, to move a projected image (optical image) projected from the projection lens 25 (as the incidence region is moved, the emission region is also moved). The user may give an instruction on a movement amount (shift amount) of the incidence region or the optical image by operating the main body operation unit 280.

Figure 6A:
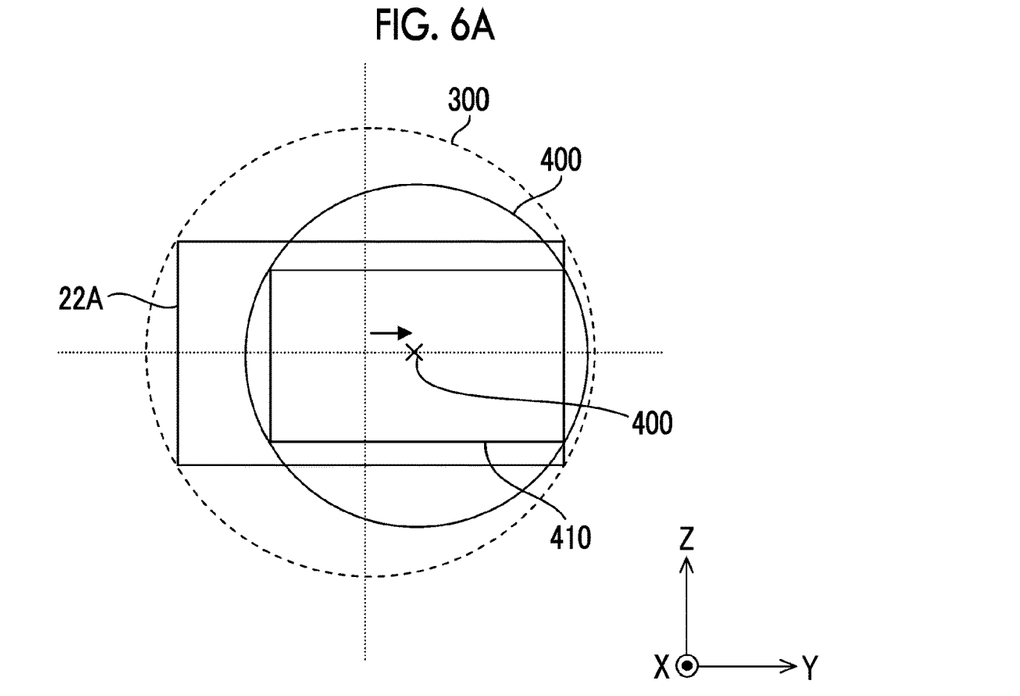
FIGS. 6A and 6B are diagrams showing movement of an incidence region in a second mode.
Figure 6B:
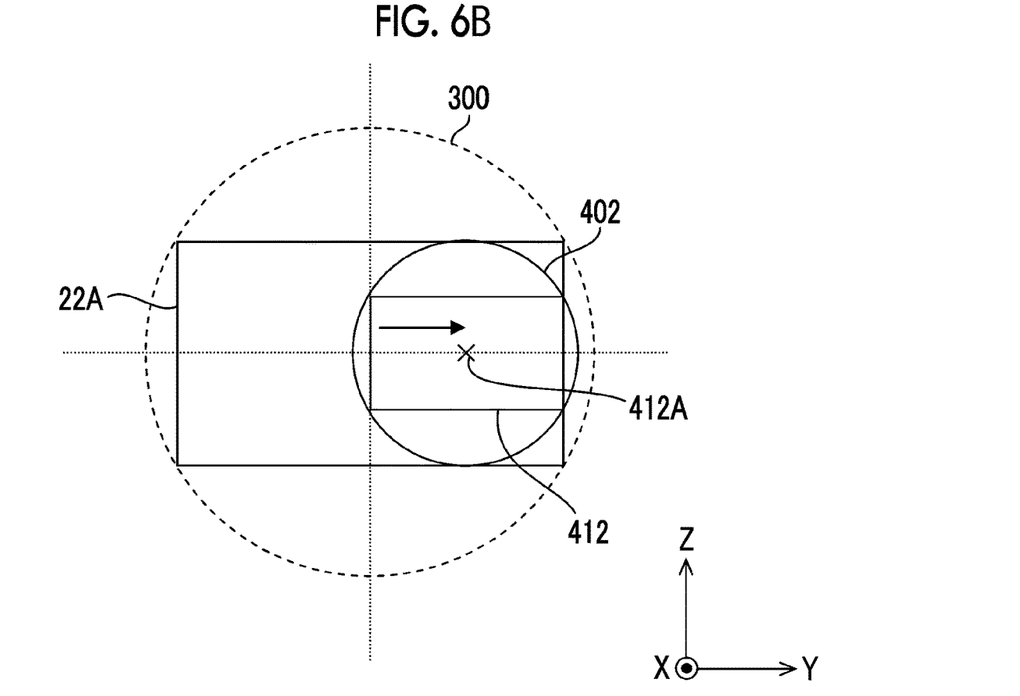

FIGS. 6A and 6B are diagrams showing examples of the incidence region in the second mode, in the optical region 22A of the DMD 22. The display control unit 230 (control unit) sets the incidence region at a position according to the movement amount as instructed. In the example shown in FIG. 6A, the display control unit 230 moves the incidence region in a +Y-axis direction (direction of the arrow in FIG. 6A) from a case of the first mode (the center of the optical region 22A is the center of the incidence region), to define an incidence region 410 centered on a center point 410A. The incidence region 410 is a second range narrower than the first range described above for the first mode. The display control unit 230 defines the emission region in a range within the incidence region 410 (second range) (the same applies to the following examples). The movement control unit 240 (control unit) controls the relay optical system 21 and the like to emit a pencil of light 400 that covers the incidence region 410 (specific method will be described later).

Further, in the example shown in FIG. 6B, the display control unit 230 moves the incidence region in the +Y-axis direction (direction of the arrow in FIG. 6B) (the movement amount is larger than that in the example shown in FIG. 6A), to define an incidence region 412 (a second range narrower than the first range) centered on a center point 412A. The movement control unit 240 emits a pencil of light 402 that covers the incidence region 412.

Figure 7:
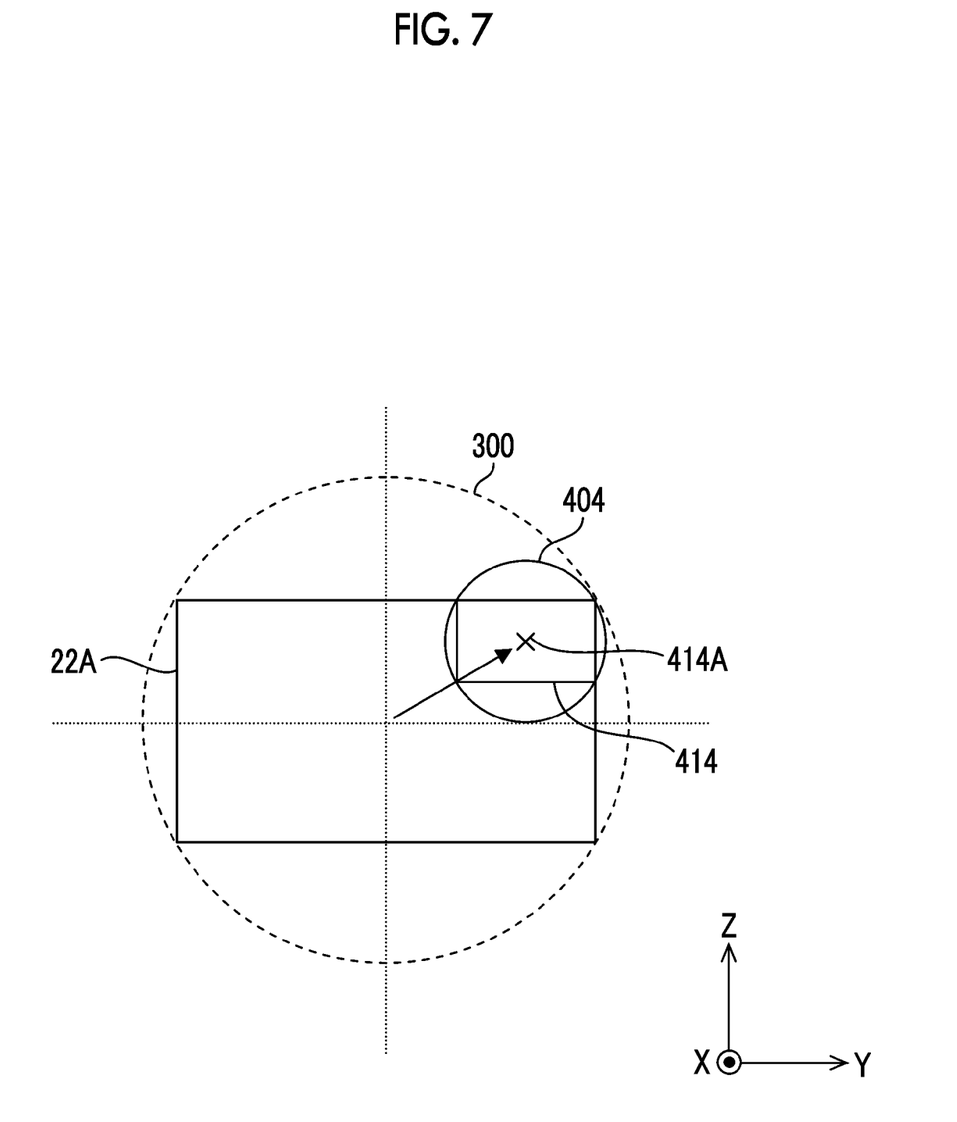
FIG. 7 is another diagram showing movement of the incidence region in the second mode.

FIG. 7 is another diagram showing an aspect in which the position of the incidence region is moved. In the example shown in FIG. 7, the display control unit 230 moves the incidence region in the +Y-axis direction and a +Z-axis direction (direction of the arrow in FIG. 7) (the movement amount is larger than that in each of the examples of FIGS. 6A and 6B), to define an incidence region 414 centered on a center point 414A. The incidence region 414 is a second range narrower than the first range. Further, the movement control unit 240 emits a pencil of light 404 that covers the incidence region 414.

As shown in the examples of FIGS. 6A, 6B, and 7, the incidence region becomes narrower as the movement amount is increased, in a case where the aspect ratio of the incidence region (projected image) is maintained and the maximum size of the incidence region is ensured. Therefore, the diameter of the pencil of light is changed according to the incidence region, so that the loss of the amount of light can be restrained and an image with high brightness can be projected. The movement control unit 240 makes the convex lens 21H and/or the concave lens 21I advance and retreat to change the zoom magnification of the zoom optical system 21F, so that the first mode and second mode can be switched and the diameter of the pencil of light can be changed.

<Movement of Incidence Region>

Figure 8:
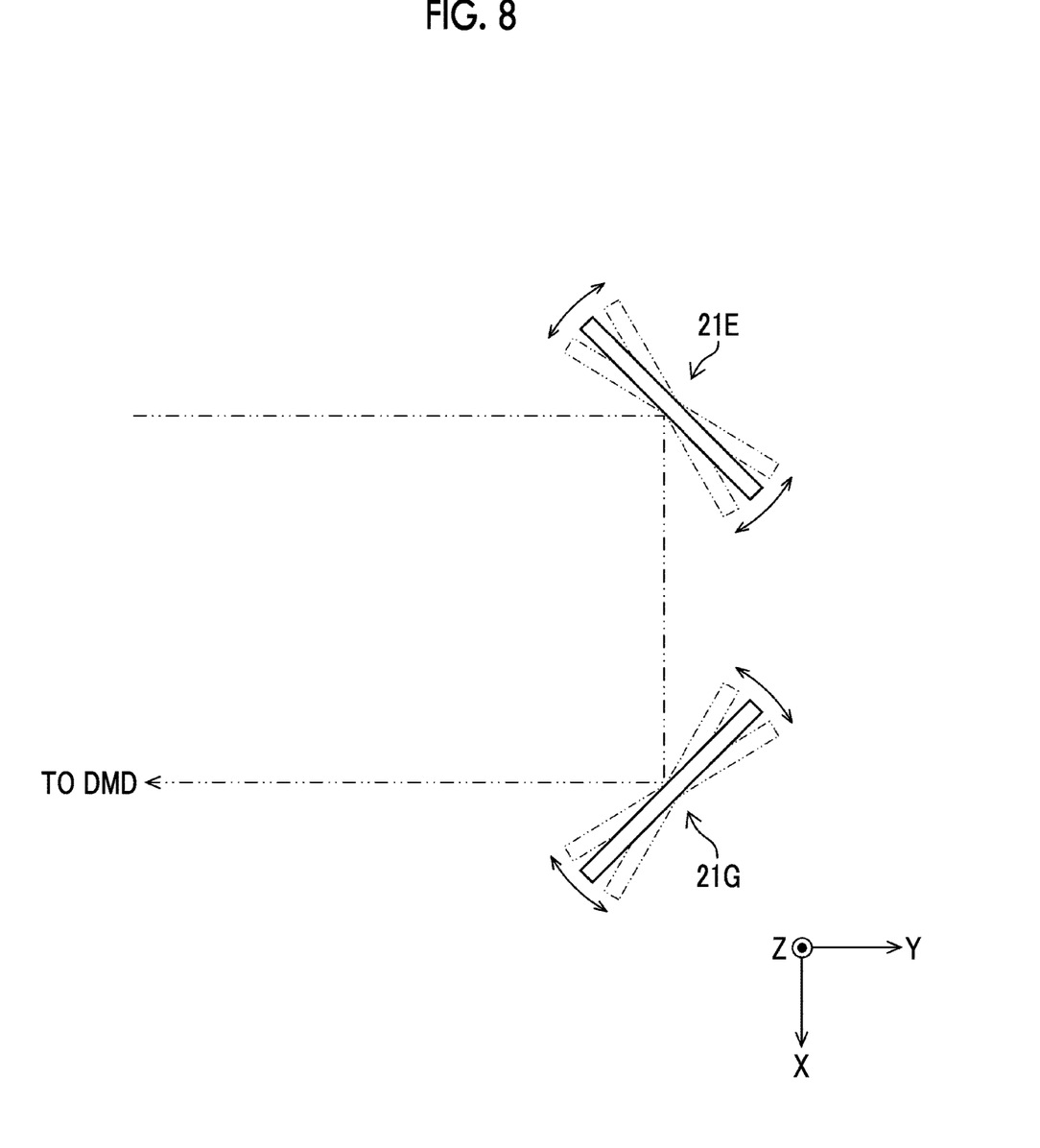
FIG. 8 is a diagram showing rotation of a first and second mirrors.
Figure 9:
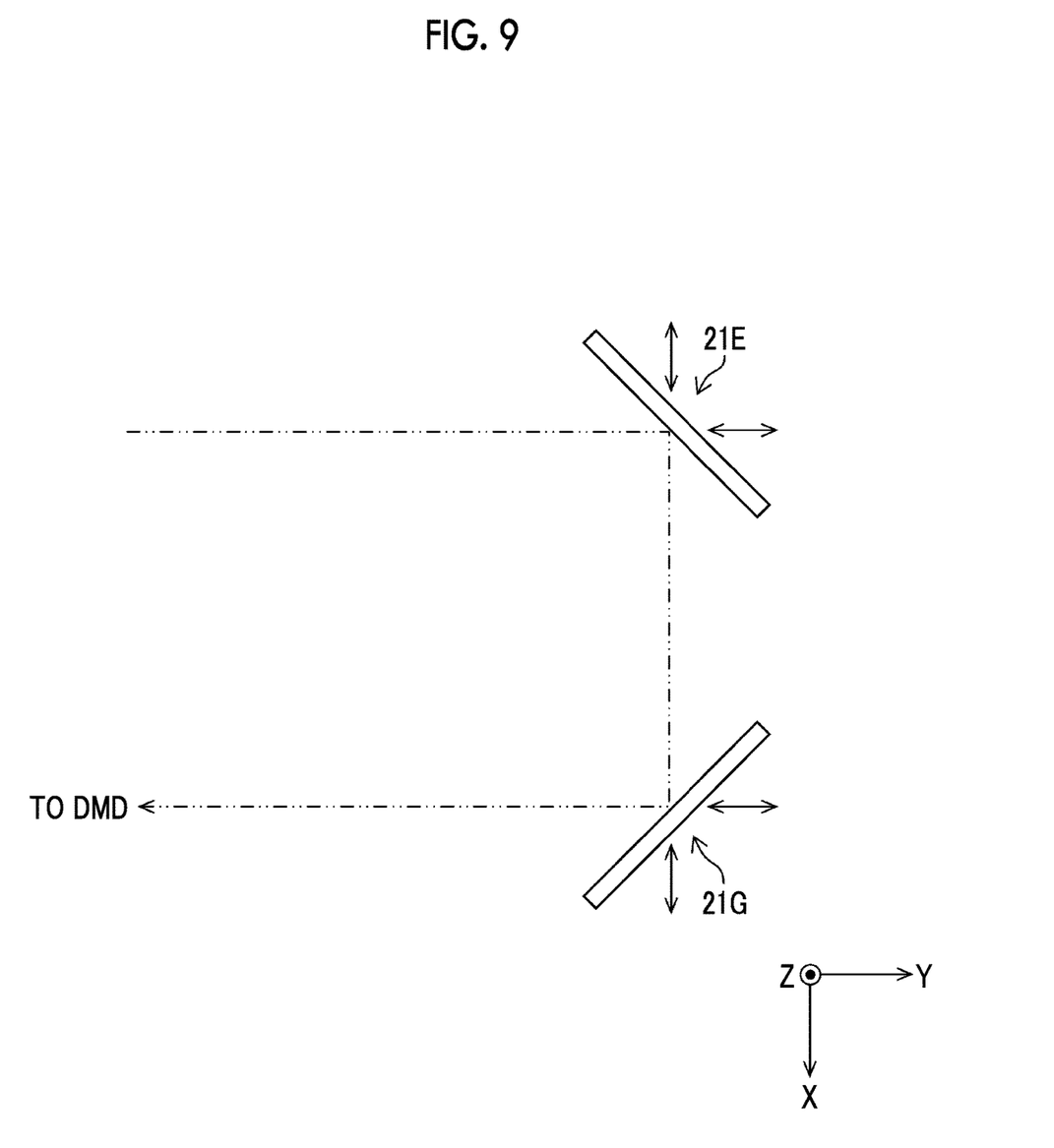
FIG. 9 is a diagram showing parallel movement of the first and second mirrors.

The movement control unit 240 moves a part of the relay optical system 21 (relay optical system) to enable the position of the incidence region with respect to the projection lens 25 to be moved. The movement control unit 240 (control unit), for example, moves the first mirror 21E and/or the second mirror 21G (in FIG. 8, rotates the first mirror 21E and/or the second mirror 21G around the Z-axis) as shown in FIG. 8, to enable the position of the incidence region to be moved. Alternatively, the movement control unit 240 (control unit) moves the first mirror 21E and/or the second mirror 21G (in FIG. 9, moves the first mirror 21E and/or the second mirror 21G in directions parallel to the X-axis and Y-axis directions) as shown in FIG. 9, to enable the position of the incidence region to be moved. Alternatively, the movement control unit 240 may move the position of the incidence region in response to the movement of the zoom optical system 21F (in FIG. 10, the rotation of the zoom optical system 21F around the Y-axis and the movement of the zoom optical system 21F in a direction parallel to the Y-axis direction) as shown in FIG. 10.

The movement control unit 240 (moving mechanism) may move the DMD 22 and/or the total reflection prism 23 to move the incidence region. In this case, the movement of the DMD 22 (electro-optical panel) is synchronized with the movement of a part of the relay optical system 21, so that the position of the incidence region can be greatly moved.

Figure 10:
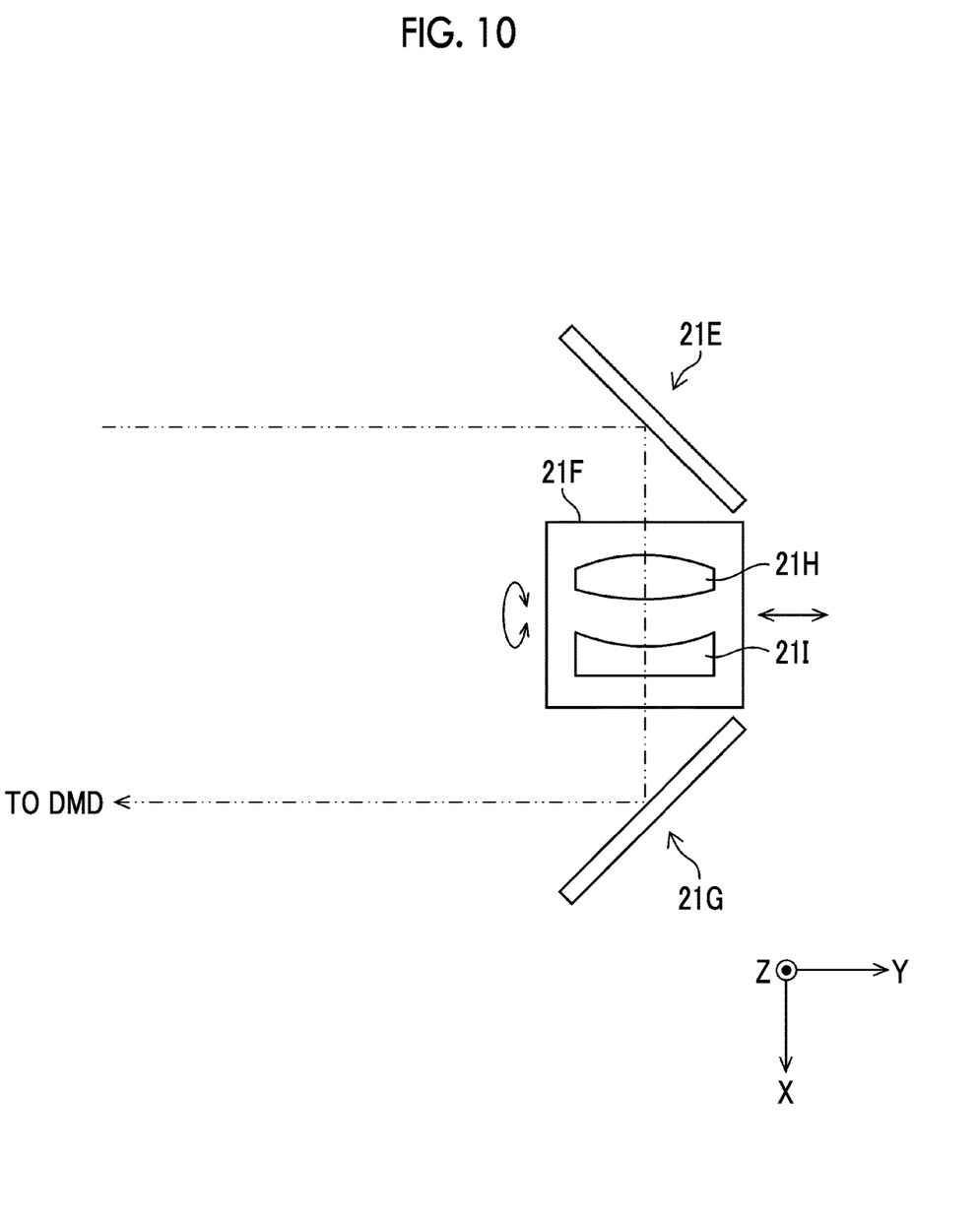
FIG. 10 is a diagram showing movement of a zoom optical system.

The movement control unit 240 (moving mechanism) is not limited to the aspects illustrated in FIGS. 8 to 10, and may perform movement in the X-axis, Y-axis, and Z-axis directions or around the axes (rotation, parallel movement) and also perform movement in combination of a plurality of the movement.

<Luminance Adjustment in Second Mode>

As described above, in the second mode, since the display control unit 230 changes the zoom magnification of the zoom optical system 21F to narrow the pencil of light, the luminance of light incident on the DMD 22 becomes high and a bright projected image can be obtained. In this case, the light source control unit 250 (control unit) changes the luminance of light emitted from the laser light source 20A in response to the instruction of the user via the main body operation unit 280 or without the instruction, to enable the brightness of the projected image to be adjusted. The light source control unit 250 may change the luminance of light emitted from the light source according to a ratio of the size of the first range and the size of the second range. In other words, the luminance of the light of the light source in the second mode may be lower than the luminance of the light of the light source in the first mode.

<Third Mode>

Figure 11:
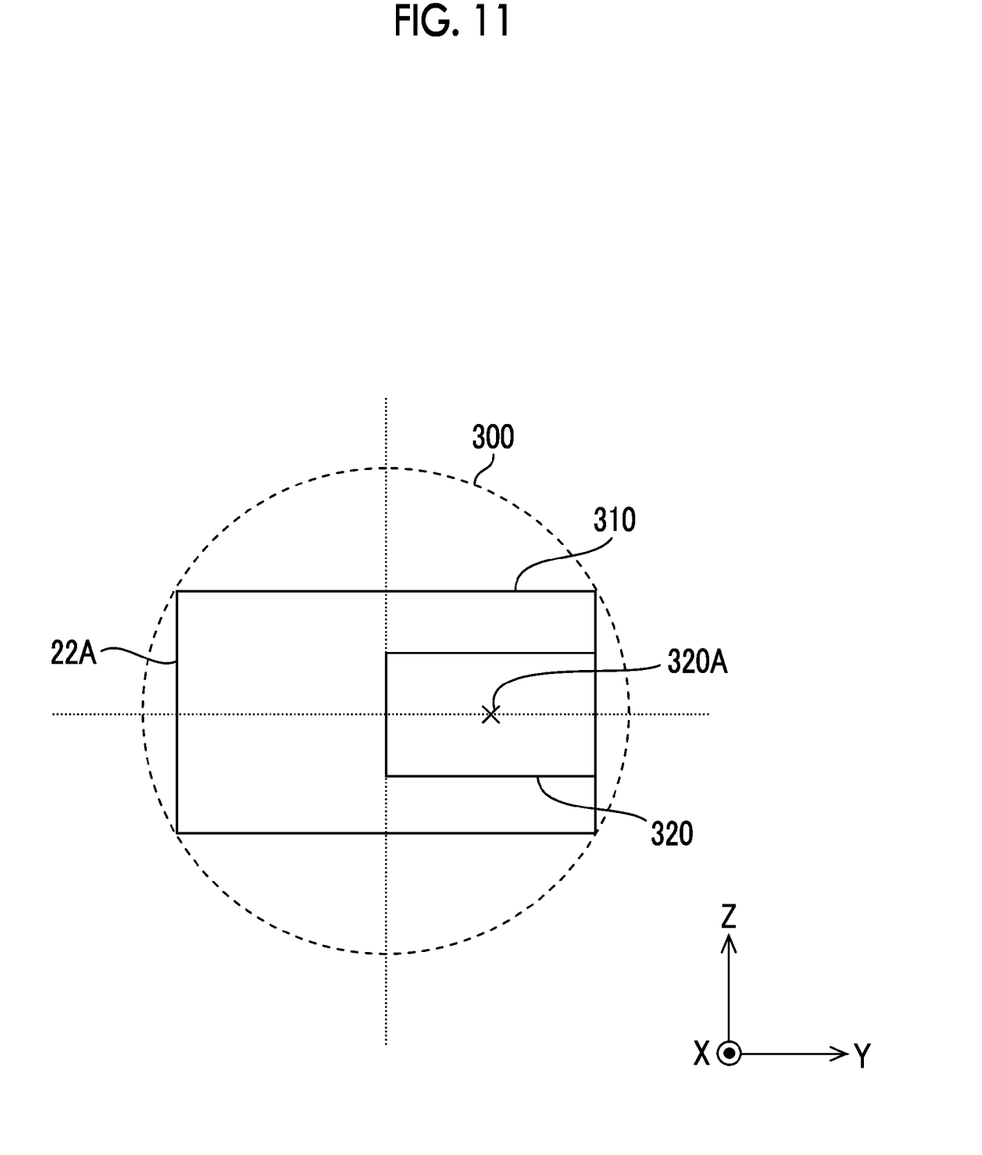
FIG. 11 is a diagram showing movement of an incidence region in a third mode.

It is preferable that the projection device 1 comprises a third mode different from the first mode and the second mode. In the third mode, in the projection device 1, the display control unit 230 (control unit), for example, controls the third mode, as shown in FIG. 11, to enable a third range narrower than the incidence region 310 (first range) to be defined as an emission region 320 (emission region; a center point 320A is the center). Comparing FIGS. 5A and 5B and 11, the emission region 320 of the third mode is narrower than the emission region 311 of the first mode. With such control performed, the emission region 320 and a non-emission region are moved within the range of the incidence region 310, so that the projected image (optical image) can be moved. The aspect ratio of the emission region 320 is the same as that of the incidence region 310.

<Difference in Image Movement Between Second Mode and Third Mode>

It is common that the projected images in the second mode and the third mode can be moved. However, in the second mode, the movement of the position of the incidence region with respect to the electro-optical panel moves the projected image, whereas in the third mode, the movement of the position of the emission region in the incidence region moves the projected image. In the third mode, the projected image can be moved quickly and easily because a part of the zoom optical system 21F is not moved, but light utilization efficiency is decreased because a part of light in the incidence region is not emitted to the projection lens 25. The movement of the projected image using the third mode is also used in JP2006-246306A, which is the related art. On the other hand, in the second mode, light utilization efficiency is high because the light of the incidence region to be required is narrowed.

<Other Configurations of Optical System>

In the above-described embodiment, the light source unit 20 emits red light, green light, and blue light in a time-division manner. In addition to such an aspect, in the projection device according to the present invention, the light source unit may emit red light, green light, and blue light at the same time, the control unit may make the light incident on the DMDs corresponding to red light, green light, and blue light, respectively, to generate optical images, and the generated optical images may be superimposed by an optical member such as a prism, to form a projected image.

Although the embodiment and other examples of the present invention have been described above, the present invention is not limited to the above-described aspects, and various modifications can be made without departing from the spirit of the present invention.

EXPLANATION OF REFERENCES

1: projection device
2: main body
20: light source unit
20A: laser light source
20B: phosphor wheel
20C: mirror
20D: color wheel
21: relay optical system
21A: rod integrator
21B: lens
21C: lens
21D: lens
21E: first mirror
21F: zoom optical system
21G: second mirror
21H: convex lens
21I: concave lens
22: DMD
22A: optical region
22B: non-optical region
23: total reflection prism
24: video display unit
25: projection lens
25A: zoom lens
25B: focus lens
25C: fixed lens
210: main control unit
220: image input unit
230: display control unit
240: movement control unit
250: light source control unit
260: power connector
262: power control unit
280: main body operation unit
290: storage unit
292: focus drive unit
294: zoom drive unit
300: pencil of light
310: incidence region
311: emission region
312: emission region
320: emission region
320A: center point
400: pencil of light
402: pencil of light
404: pencil of light
410: incidence region
410A: center point
412: incidence region
412A: center point
414: incidence region
414A: center point
L: optical axis

What is claimed is:

1. A projection device comprising:
a light source;
an electro-optical panel having an optical region in which an electro-optical element that controls transmission or reflection of light is provided, the electro-optical panel having an incidence region which is defined in the optical region and on which light from the light source is incident and an emission region which is defined in the optical region and from which the light incident on the incidence region is emitted by the electro-optical element;
a projection lens that projects the light emitted from the emission region; and
a control unit that controls the electro-optical panel or the light incident on the electro-optical panel from the light source to define the incidence region and the emission region,
wherein the control unit controls a second mode,
in a case where at least a part of the optical region is defined as a first range, the second mode is a mode in which a second range narrower than the first range is the incidence region and a range within the second range is the emission region.

2. The projection device according to claim 1,
wherein the control unit controls a first mode and the second mode, and the first mode is a mode in which the first range is the incidence region and a range within the first range is the emission region.

3. The projection device according to claim 2, wherein the control unit moves a position of the incidence region with respect to the projection lens to move an optical image projected from the projection lens.

4. The projection device according to claim 2, wherein the control unit moves a position of the incidence region in the electro-optical panel to move a position of the incidence region with respect to the projection lens.

5. The projection device according to claim 3, further comprising:
a relay optical system provided in an optical path from the light source,
wherein the control unit moves a part of the relay optical system to move the position of the incidence region with respect to the projection lens.

6. The projection device according to claim 5, wherein the relay optical system has a zoom optical system provided in the optical path from the light source, and
the control unit changes a size of the incidence region by changing a zoom magnification of the zoom optical system, to switch between the first mode and the second mode.

7. The projection device according to claim 5, further comprising:
a moving mechanism that moves the electro-optical panel,
wherein the control unit synchronizes movement of the electro-optical panel by the moving mechanism with movement of the part of the relay optical system to move the position of the incidence region.

8. The projection device according to claim 4, wherein the control unit moves the position of the incidence region in the second mode.

9. The projection device according to claim 8, wherein the control unit moves the position of the defined incidence region in the second mode, to move an optical image projected from the projection lens.

10. The projection device according to claim 1, wherein the control unit changes luminance of light emitted from the light source according to a ratio of a size of the first range and a size of the second range, in the second mode.

11. The projection device according to claim 2, wherein the control unit further controls a third mode, the third mode is a mode in which the first range is the incidence region and a third range narrower than the first range is the emission region, and
the third range of the third mode is narrower than a range of the emission region in the first mode.

12. The projection device according to claim 11, wherein the control unit moves a position of the incidence region in the second mode to move a projected image projected from the projection lens, and
the control unit moves a position of the emission region in the third mode to move the projected image.

13. The projection device according to claim 3, wherein the control unit moves a position of the incidence region in the electro-optical panel to move a position of the incidence region with respect to the projection lens.

14. The projection device according to claim 4, further comprising:
a relay optical system provided in an optical path from the light source,
wherein the control unit moves a part of the relay optical system to move the position of the incidence region with respect to the projection lens.

15. The projection device according to claim 6, further comprising:
a moving mechanism that moves the electro-optical panel,
wherein the control unit synchronizes movement of the electro-optical panel by the moving mechanism with movement of the part of the relay optical system to move the position of the incidence region.

16. The projection device according to claim 5, wherein the control unit moves the position of the incidence region in the second mode.

17. The projection device according to claim 6, wherein the control unit moves the position of the incidence region in the second mode.

18. The projection device according to claim 7, wherein the control unit moves the position of the incidence region in the second mode.

19. The projection device according to claim 2, wherein the control unit changes luminance of light emitted from the light source according to a ratio of a size of the first range and a size of the second range, in the second mode.

20. The projection device according to claim 3, wherein the control unit changes luminance of light emitted from the light source according to a ratio of a size of the first range and a size of the second range, in the second mode.

* * * * *